(12) United States Patent
Klügel

(10) Patent No.: US 12,335,155 B2
(45) Date of Patent: Jun. 17, 2025

(54) METHOD FOR OPERATING ONE OR MORE NODES IN A COMMUNICATIONS NETWORK FOR COORDINATING TRANSMISSIONS OF DIFFERENT NODES IN THE NETWORK USING DATA VALIDITY AS DECISION METRIC

(71) Applicant: Airbus (S.A.S.), Blagnac (FR)

(72) Inventor: Markus Klügel, Taufkirchen (DE)

(73) Assignee: Airbus (S.A.S.), Blagnac (FR)

( * ) Notice: Subject to any disclaimer, the term of this patent is extended or adjusted under 35 U.S.C. 154(b) by 232 days.

(21) Appl. No.: 18/071,144

(22) Filed: Nov. 29, 2022

(65) Prior Publication Data

US 2023/0179529 A1  Jun. 8, 2023

(30) Foreign Application Priority Data

Dec. 2, 2021 (EP) ..................................... 21212009

(51) Int. Cl.
*H04L 47/24* (2022.01)
*H04L 47/30* (2022.01)

(52) U.S. Cl.
CPC .............. *H04L 47/24* (2013.01); *H04L 47/30* (2013.01)

(58) Field of Classification Search
None
See application file for complete search history.

(56) References Cited

U.S. PATENT DOCUMENTS

2006/0209763 A1\* 9/2006 Emeott ................. H04L 1/0002
  370/332
2014/0010081 A1  1/2014 Benveniste
(Continued)

FOREIGN PATENT DOCUMENTS

| CN | 111182645 A | 5/2020 |
| CN | 111884947 A | 11/2020 |
| CN | 111935550 A | 11/2020 |

OTHER PUBLICATIONS

Tripathi, V. et al., "A Whittle Index Approach to Minimizing Functions of Age of Information," 2019 57th Annual Allerton Conference on Communication, Control and Computing (Allerton), Sep. 2019, pp. 1160-1167. http://doi.org/10.1109/Allerton.2019.8919842.

(Continued)

*Primary Examiner* — Anh Ngoc M Nguyen
(74) *Attorney, Agent, or Firm* — KDW Firm PLLC

(57) ABSTRACT

A method for operating a node in a communications network for coordinating transmissions of different nodes in the network to improve coordination of communication between network nodes. The node includes a validity state and estimation module, wireless state monitor module, wireless configuration space module, and wireless configurator module. The VSE assigns a data validity value to a data packet and/or to a transmission buffer of the node. The data validity value reflects the usefulness of the data packet for an application and is preferably age based. The WSM gathers physical transmission property data indicative of transmission properties of a communication link provided by the network between the node and another node. The WCS determines a parameter configuration space amenable for transmitting the data packet via the communication link and the WCON sets corresponding transmission parameters based on the data validity value and physical transmission property data. Finally, the data packet is transmitted.

19 Claims, 3 Drawing Sheets

(56) References Cited

U.S. PATENT DOCUMENTS

2015/0257024 A1   9/2015  Baid et al.
2020/0059437 A1* 2/2020  Donley ............... H04L 47/6275
2020/0374241 A1* 11/2020 Gafni .................... H04L 49/604

OTHER PUBLICATIONS

Jhunjhunwala et al., "Optimal AoI-Aware Scheduling and Cycles in Graphs," IEEE Transactions on Communications vol. 68, Issue 3, Dec. 24, 2019.
Yin, Bo et al., "Application-Oriented Scheduling for Optimizing the Age of Correlated Information: A Deep-Reinforcement-Learning-Based Approach," Student Member, IEEE Internet of Things Journal, vol. 7, No. 9, Sep. 2020.
European Search Report for U.S. Appl. No. 21/212,009 dated May 4, 2022.

\* cited by examiner

METHOD FOR OPERATING ONE OR MORE NODES IN A COMMUNICATIONS NETWORK FOR COORDINATING TRANSMISSIONS OF DIFFERENT NODES IN THE NETWORK USING DATA VALIDITY AS DECISION METRIC

TECHNICAL FIELD

The disclosure herein relates to a method for operating one or more nodes in a communication network for the purpose of coordinating transmissions of different nodes in the network.

BACKGROUND

MAC layer coordination is a standard task in any wireless network and may be classified into uncoordinated access (e.g., ALOHA), distributed coordination (as used by WiFi and Bluetooth) or central coordination (as used in cellular and satellite networks). While coordination tasks have been proposed in many different forms, the use of information age (AoI) is relatively new and has mainly been discussed in research papers. The extension to age-penalties, i.e., functions that map AoI to a numeric value that determines its importance, is only a few years old and only treated in a subset of research works.

Known solutions are disclosed in:

Tripathi, V., & Modiano, E. (2019). A Whittle Index Approach to Minimizing Functions of Age of Information. In 2019 57th Annual Allerton Conference on Communication, Control, and Computing (Allerton) (pp. 1160-1167). IEEE. https://doi.org/10.1109/ALLERTON.2019.8919842;

Yin, B., Zhang, S., & Cheng, Y. (2020). Application-Oriented Scheduling for Optimizing the Age of Correlated Information: A Deep-Reinforcement-Learning-Based Approach. IEEE Internet of Things Journal, 7(9), 8748-8759. https://doi.org/10.1109/JIOT.2020.2996562; or Jhunjhunwala, P. R., Sombabu, B., & Moharir, S. (2020). Optimal AoI-Aware Scheduling and Cycles in Graphs. IEEE Transactions on Communications, 68(3), 1593-1603. https://doi.org/10.1109/TCOMM.2019.2962038.

While all three publications consider a scheduling problem to optimize an age-penalty (i.e., a form of data validity), they treat a simple transmission selection in the sense to define who is allowed to transmit next in a centralized network.

Additional reference is made to CN 111182645 A, CN 111884947 A, and CN 111935550 A.

SUMMARY

An object of the disclosure herein is to improve coordination of communication between nodes of a communications network, preferably with respect to efficiency, reliability, and overprovisioning. The improvements are preferably made in, but not limited to, the context of avionics and satellite communication.

The object is achieved by the subject matter disclosed herein.

The disclosure herein provides a method for operating a node in a communications network, the node comprising a validity state and estimation module (VSE), a wireless state monitor module (WSM), a wireless configuration space module (WCS), and a wireless configurator module (WCON), wherein the method comprises:

a) assigning a data validity value to a data packet and/or to a transmission buffer of the node by the VSE;
b) storing the data packet in the transmission buffer;
c) gathering physical transmission property data, by the WSM, the physical transmission property data being indicative of the transmission properties of a communication link provided by the communications network between the node to another node in the communications network;
d) determining a parameter configuration space, by the WCS, that is amenable for transmitting the data packet via the communication link;
e) setting transmission parameters, by the WCON, that are included in the parameter configuration space for a data transmission over the communications network based on the data validity value and the physical transmission property data;
f) transmitting of the data packet, by the node, from the transmission buffer over the communications network to another node at a point in time and in a manner determined by the transmission parameters set in step e).

The disclosure herein provides a method for operating a communications network having a plurality of nodes, each node comprising a validity state and estimation module (VSE), a wireless state monitor module (WSM), a wireless configuration space module (WCS), and a wireless configurator module (WCON), wherein the method comprises:

a) in at least one node, assigning a data validity value to a data packet and/or to a transmission buffer of the node by the VSE;
b) storing the data packet in the transmission buffer;
c) in at least one node, gathering physical transmission property data, by the WSM, the physical transmission property data being indicative of the transmission properties of a communication link between a first node and a second node;
d) in at least one node, determining a parameter configuration space, by the WCS, that is amenable for transmitting the data packet via the communication link;
e) in at least one node, setting transmission parameters, that are included in the parameter configuration space, by the WCON for a data transmission over the communications network based on the data validity value and the physical transmission property data;
f) transmitting of the data packet, by the first node, from the transmission buffer of the first node to the second node at a point in time and in a manner determined by the transmission parameters set in step e).

Preferably, in step d) the respective WCS of the first node and the second node negotiate the parameter configuration space.

Preferably, in step a) the VSE of the first node requests and receives from the VSE of the second node a validity estimate value. Preferably, the VSE of the first node determines the data validity value also on the received validity estimate value.

Preferably, in step c) the WSM of the first node requests and receives from the WSM of the second node a physical transmission property data report that includes physical transmission property data as determined by the WSM of the second node, and the WSM of the first node determines the physical transmission property data also based on the physical transmission data report.

Preferably, the communications network is chosen from a group consisting of a wireless communications network, a cellular network, a WiFi network, a radio communications network, an avionic communications network or a satellite communications network.

Preferably, step a) comprises assigning each data packet a packet data validity value and determining a transmission buffer data validity value based on the data packet validity values of the data packets to be stored in the same transmission buffer and assigning to the transmission buffer the transmission buffer data validity value as the data validity value.

Preferably, in step a) the data validity value is based on a data packet age of the data packet or on at least one predetermined validity feature that is indicative for the validity of the data packet, when the data packet is processed by another node.

Preferably, the data packet age is determined based on a time interval between a point in time at which the data packet was generated or received by the VSE and a point in time at which the data packet is processed by another module or node.

Preferably, the node comprises a plurality of transmission buffers, and in step b) each data packet is stored in one of the transmission buffers.

The disclosure herein provides a computer program including instructions that, upon execution by a suitable data processing device, performs one, some or all of the steps of a previously described method.

The disclosure herein provides a node configured for communicating in a communications network, wherein the node comprises a validity state and estimation module (VSE), a wireless state monitor module (WSM), a wireless configuration space module (WCS), and a wireless configurator module (WCON), and the node is configured to perform a previously described method and/or includes a preferred computer program.

Preferably, the node is configured as an avionic wireless communication device, a satellite communication device, a vehicle or a sensor for a vehicle. Preferably, the vehicle is an aircraft, a drone, or a high-altitude platform.

The disclosure herein provides a data storage device or data carrier signal including a preferred computer program.

This disclosure is related to the technical field of wireless communication networks, namely to the transmission coordination on medium access control (MAC) layer.

Here, preferably wireless transmission devices ("nodes") are considered that are part of an avionic or satellite network and preferably have the task to transmit information or data packets in a store-and-forward fashion. That is, the nodes receive information or data packets from incoming links that could be wired or wireless, or from an application running on the same device.

The nodes store these data packets locally in a transmission buffer and transmit them to outgoing links towards their destination. The switches can be part of a centrally organized (e.g., cellular) network that is on-board or external to an aircraft, be part a satellite network, or be part of a decentralized network such as WiFi or of a broadcast network such as ADS-B or VDL2.

The nodes are configured to process data packets from different logical connections usually called network "flows". Each flow contains a data stream, i.e., a sequence of packets, that is transported from a source to a destination through the network.

The nodes have in a known manner a wireless interface via which several destinations can be addressed. Each outgoing destination can be associated with a separate transmission buffer to store data that has not been delivered to it.

In the targeted wireless network scenario, transmissions from different nodes are coordinated to reduce or avoid harmful interference that would make the correct reception of the transmitted data difficult.

The proposed idea is to use the concept of "data validity" to coordinate these transmissions. Data validity as understood in this disclosure is considered as a numeric value that is assigned to a data packet and that is indicative of how valid (urgent or useful) this data packet is in the context of the application currently performed.

Depending on the use-case, high or low validity values may be desired. Data validity may include a penalty function that maps the "packet age" (also referred to as "age of information"), which is the time elapsed since a packet has been generated, to a data validity value. The proposed idea is to preferably use age-penalties or other data validity metrics to decide preferably who transmits in which time-frequency slot, preferably with which transmission power and preferably with which modulation-coding-scheme (MCS) and so on.

Alternatively or additionally, data validity is used to improve parameters for random access procedures, such as access probability or back-off mechanism.

In this disclosure, it is considered that data validity may be used for very fine-grained resource allocation and parameter selection and also includes decentralized coordination scenarios. It is one aspect of the disclosure herein to extend the application of data validity to other network components.

The coordination of wireless transmissions has a significant impact on the communication performance perceived by data flows, in terms of data rate, delay and perceived link stability. For example, if a node uses a modulation and coding scheme that is not suitable for the current channel quality, it can get a bad data rate due to too low modulation or a high packet loss due to too many errors.

Both have the potential to degrade the communication performance, which is particularly crucial in real-time applications. Furthermore, if several nodes transmit wirelessly, only a subset of them may transmit simultaneously, where the exact number depends on the number of available channels and used technologies, such as direct sequence spreading, time/frequency division multiplexing, etc.

Therefore, communication among different nodes is coordinated, either centrally or decentrally. In contrast to general networking, in which the main purpose is to transport data, communication in avionic context usually serves a distinct technical purpose. For example, often the goal is to sense the state of a specific component, to control an actuator or even to distribute telemetry data, such as an aircraft position, via a wireless channel.

While each of these purposes has an associated performance measure (for example sensing error, delay until a command is received, position estimation accuracy), current wireless MAC techniques are typically designed for general data transfer with focus on throughput but not necessarily the desired performance measures.

Consequently, within avionic context the system is over-provisioned. This leads to significant inefficiency in terms of network usage and supported applications and in second instance to high communication cost. With the measures disclosed herein many of the related performance measures can be mapped to a "data validity" function that associates a piece of data with a usefulness value.

Most prominently, data validity refers to an "age-penalty" that decides transmission urgency depending on how old a piece of data is. However, also other validity metrics can be used.

By using data validity as a basis for transmission coordination, the network can be actively optimized for real-time data gathering/sensing, e.g., minimizing sensing error or improving position estimation accuracy. The networks have improved stability to support the applications running over them and enable more efficient use of wireless spectrum, leading to an overall lower communication cost and more stable data links.

The methods described herein improve the coordination of wireless transmissions on network nodes, where the term "node" can refer to a base station (in cellular networks), an access point (in WiFi networks), end devices (like mobile phones, PCs, sensors, small pieces of hardware, but also aircrafts, drones, high-altitude platforms (HAPs), etc.) or relays that are dedicated to forwarding data.

A set of such nodes is considered, that exchange data preferably wirelessly. In order to avoid mutual interference, the wireless transmissions of different nodes are coordinated, which may happen in a centralized or decentralized fashion.

Coordination can be done by identifying a particular configuration for when and how a node should transmit. For example, in a time-division multiple access (TDMA) system, each node has an exclusively assigned slot. This time slot is a time-span relative to a synchronization signal and each node complies with this assignment by configuring its transmission to fall into the correct period.

In addition to such TDMA assignments, also other parameters can be configured on the nodes, such as the used frequency, modulation and coding scheme, transmission power, multi-antenna use and so forth.

Preferably, wireless transmission coordination and configuration is done based on data validity. The validity of data thereby captures how useful a piece of data currently is for the application generating the data flow. For example, if the flow corresponds to an application that monitors a fast varying system (e.g., forces on a sensor), then its associated data loses validity when it becomes older.

In this case, data validity is preferably related to the time elapsed since the data has been injected into the network, which is referred to as data "age".

In another example, if a flow corresponds to an uncritical file transfer, its data may never lose validity.

The main idea of the disclosure herein is the use of data validity when coordinating wireless nodes, i.e., when deciding which node transmits when on which channel and with which transmission parameters. It is considered that each node has incoming data that should be transmitted over a wireless channel. The data can originate from applications on the same node or be external data that should be forwarded.

The data may be grouped into different traffic flows, where a flow preferably refers to a specific data sequence that originates from one or a set of applications.

To cope with the situation that data cannot be directly forwarded, the nodes may store the data as data packets in multiple transmission buffers, in which the data remain until it is forwarded to its destination node.

Each transmission buffer thereby corresponds to a data structure holding the packets that belong to a specific set of flows. The exact grouping may depend on the application—in the extreme case there can be one transmission buffer per application flow, while in the other extreme there can be one transmission buffer for all flows destined to the same destination.

It is assumed that throughout the network, flows may have unique properties that differentiate them among each other, such that different nodes can identify the same set of flows. Such properties could be, e.g., the destination address and application port, which are typically used in IP networks, a specified flow identifier as is used in cellular networks, Quality of Service (QoS) classes or similar.

During operation of a typical wireless node, parts of the data from the transmission buffers are dispatched and transmitted over the wireless channel. The exact rules according to which the node transmits thereby heavily depend on the used protocols and technologies. The proposed disclosure herein considers such a node, where in addition to the typical elements of a node there are four blocks/modules:

A validity state & estimation module (VSE), a wireless state monitor (WSM), a wireless configuration space (WCS) and a wireless configurator (WCON).

The VSE assigns and holds validity estimates of data packets or transmission buffers. When a data packet enters (by generating or receiving) the node, the VSE module analyzes the validity of the data packet according to predetermined criteria, such as age or usefulness to the application, and assigns to the data packet a data validity value. The data packet is then stored in the local transmission buffer(s).

Similarly, the VSE can analyze the packets in a transmission buffer and derive a per-buffer validity value. Buffer validity could refer to, e.g., the maximum validity of all packets in the transmission buffer, or the average value. Values may also be reevaluated regularly or in reaction to a request from the WCON.

Furthermore, the VSE modules can exchange validity reports with the VSE modules of other nodes, i.e., can send and receive validity reports to and from other nodes and store the results locally.

It should be noted that depending on the exact function, either larger or lower validity values might be desirable. For example, when data "age" is used as a validity function, the computing unit can use time stamps on the packets and a local clock to determine the age of each packet. In this case, a lower data age is preferable over a large age. The data validity value is preferably an increasing function of the age that determines the priority.

When estimating, the VSE assigns to each packet a data validity value that reflects how useful the packet is. This value later determines the treatment that the packet will have in the transmission buffer and how urgent such packet should be transmitted.

To determine the validity, the VSE module may check for each packet entering the buffering system whether it has a timestamp. If not, it may add one to the packet, which is later used to determine the elapsed time since the network was entered by the packet.

Time stamp and current time value can be used to decide on the already passed delay, the packet urgency etc., based on which the VSE module creates a validity value. The exact validity function, i.e., the rule that determines the data validity value, might be set on run-time or be pre-configured.

Further, the node has a computing unit that is capable of determining the data validity value of each packet in the class whenever required. In addition to the estimation of local validity values, the VSE may also exchange data with other VSE in the network via control links.

For example, there may be a central coordinator node that coordinates the wireless transmissions of a part of the network (i.e., a base station). The VSE module of such a node may receive validity reports of other nodes and store the acquired knowledge locally in the form of a validity state. Correspondingly, the other nodes may transmit their validity estimations to the central node.

The wireless state monitor (WSM) is a module that collects data related to physical transmission properties, available parameters or their settings. The properties may refer to, e.g., the wireless channel quality, received interference level, signal-to-noise ratio or similar.

Similar as in the VSE, the WSM stores the property state of either the local node or a set of states that are reported from other nodes. Correspondingly, the WSM modules of different nodes may also exchange data among each other, similar to the VSE.

The wireless configuration space (WCS) module refers to a definition of a set of available parameters that can be configured and the associated set of allowed values. An example could be possible transmission powers of a node, supported modulation and coding schemes or available multi-antenna settings. It may also contain possible frequency channels and time-slots relative to a common time frame or settings for wireless back-off values.

In some technologies the WCS module may be statically defined for all nodes due to homogeneous hardware capabilities. In others, there might be an own configuration per node that reflects its capabilities. Again, the WCS modules may also communicate with each other to negotiate a set of allowed configurations and disseminate among each other which configuration options they support.

The wireless configurator (WCON) takes the input of all other modules, the VSE, WSM and WCS, to coordinate the transmissions of the node it resides on, and may also configure part of the other network nodes.

To do so, the WCON relies on the current validity values held in the VSE, the wireless channel states known from the WSM and the available configuration space defined by the WCS.

Depending on the technology present in the nodes (modulation formats, power options, etc.) and the underlying protocol (3G, 4G, 5G, GMR-3G, VDL2, WiFi) the WCON may effectively play the role of a central scheduler that assigns each node a time-frequency slot with given modulation and coding schemes and transmission power (e.g. in a cellular scenario), assign semi-static frequency allocation options or control the back-off value of the local node only (e.g., in WiFi scenario), among others.

The VSE and WSM may report values to each other, while the WCS modules may negotiate available parameters and WCON may be used to issue configurations on another node.

BRIEF DESCRIPTION OF THE DRAWINGS

Embodiments of the disclosure herein are described in more detail with reference to the accompanying schematic drawings that are listed below

DETAILED DESCRIPTION

Figure 1:
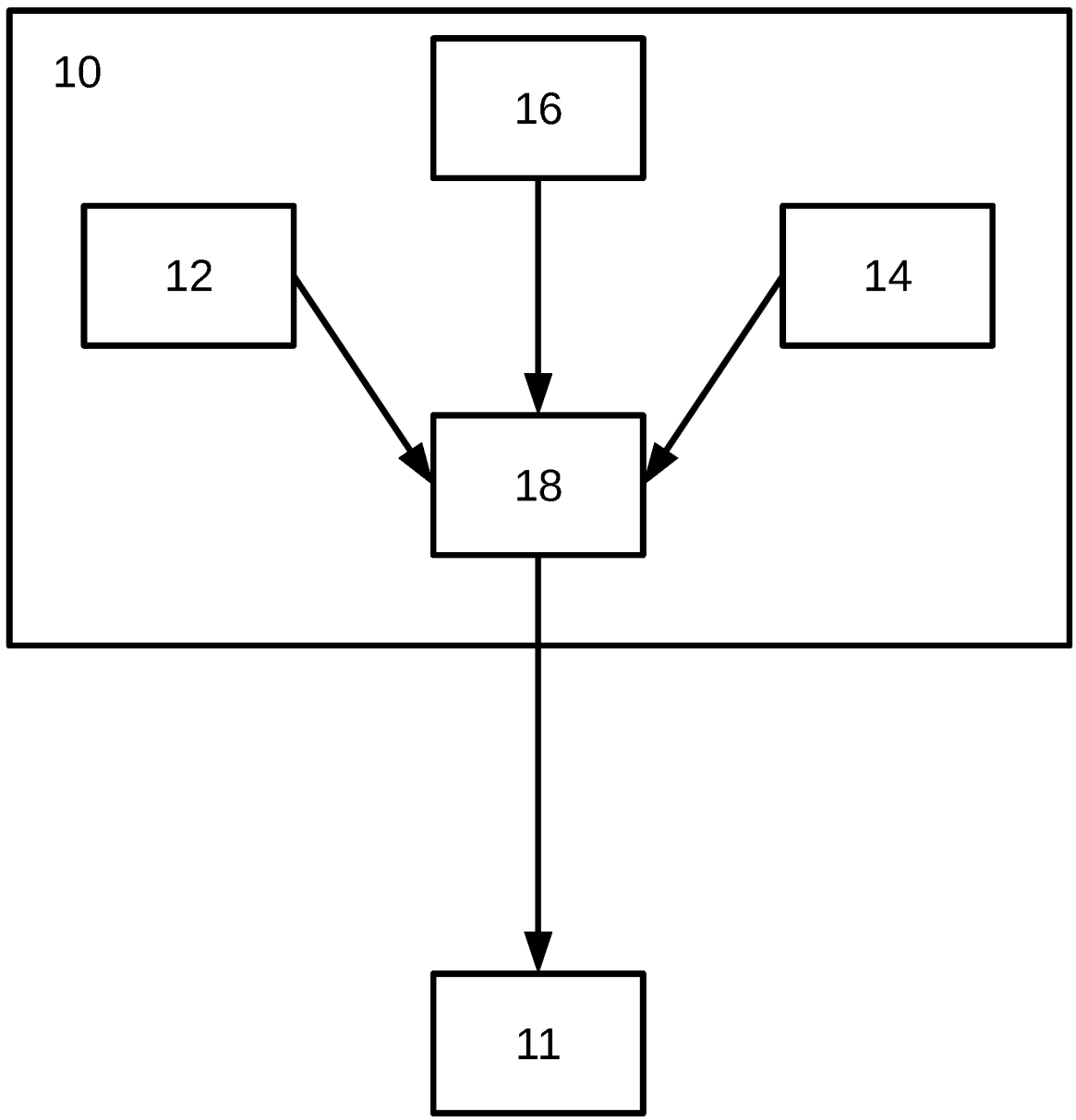
FIG. 1 depicts an embodiment of a wireless node.

Referring to FIG. 1, an embodiment of the disclosure herein is described for a VHF Data Link Mode 2 (VDL2) as defined by the International Civil Aviation Organization (ICAO) in Doc 9776 AN/970. VDL2 is a technology for avionic networks and in particular for communication with air traffic control. It is used on aircraft to dispatch short messages that are capable of replacing voice communications in a more efficient manner. VDL2 has a pre-defined set of parameters with little room for adaptation:

On physical layer, VDL2 uses D8PSK modulation together with a Reed-Solomon code forward error correction and fixed transmission power.

On MAC layer, it uses p-persistent carrier-sense multiple access (CSMA). In p-persistent CSMA, each node senses the channel for other transmissions. If there are none, it declares the channel idle and transmits its own data with fixed probability "p", or waits for a predetermined time period with probability "1−p". If it was waiting, the sensing and probabilistic transmission is repeated.

Here, the node 10 has a VSE 12, a WSM 14, WCS 16 and WCON 18.

The WSM 14 has two states reflecting the channel is sensed busy or idle. This state is an example for physical transmission property data.

The WCS 16 defines that the only variable parameter is the probability "p", which may be chosen such that $p_{low} \leq p \leq p_{high}$, wherein $p_{low}$ and $p_{high}$ are predetermined bounds. In other words, the parameter configuration space comprises the probability "p" as the only parameter.

The VSE 12 then evaluates each piece of data that the application on the considered node 10 wants to transmit to another node 11 and assigns it a data validity value according to an increasing function $g(t-t_s)$, wherein t is the current time and $t_s$ the time stamp of the piece of data. The time stamp $t_s$ can be assigned when the data packet is first received or generated by the VSE 12. The value $t-t_s$ is referred to as data "age" and the validity function $g(t-t_s)$ is an increasing function of age. As $g(t-t_s)$ increases, so does transmission urgency. The value of the validity function $g(t-t_s)$ is called the data validity value and is specific for the individual data packets. The validity function may be a linear function, a polynomial function, or other basic function that is increasing with an increasing argument.

The WCON 18 then uses the data validity values based on $g(t-t_s)$, and the busy or idle state to determine with which probability "p" to transmit.

For example, it could follow the rule:
transmit with probability p=0, if channel busy;
transmit with probability $p=\min(p_{high}; \max(p_{low}; 1-1/g(t-t_s)))$, if channel is idle. In other words, the WCON 18 sets the transmission parameters that are included the configuration space (here: probability "p") based on the data validity value (obtained by the VSE from the validity function $g(t-t_s)$) and the physical transmission property data (obtained by the WSM as the channel being busy or idle).

According to the given rule, the WCON 18 complies with p-persistent CSMA as defined in the standard. However, it assigns higher transmission probability to data packets with larger $g(t-t_s)$, resulting in preferentially transmitting data packets that are older and therefore more urgent for transmission.

Figure 2:
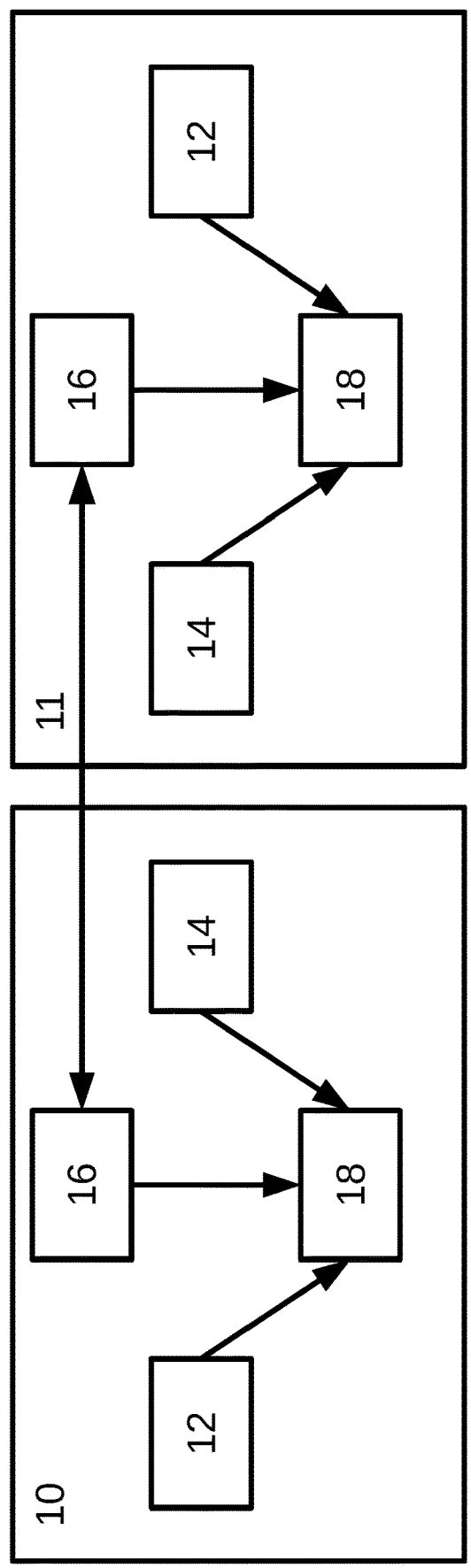
FIG. 2 depicts an embodiment of a wireless communication network having multiple nodes.

Referring to FIG. 2, an embodiment of a WiFi network is shown. The capabilities and mechanisms are slightly enhanced compared to VDL Mode 2. The WiFi network includes a first node 10 and a second node 11. In particular each node 10, 11 has a broader choice of transmission parameters, such as transmission power, channel to transmit on and modulation and coding schemes (MCS).

The exact available parameter set, i.e. the parameter configuration space, depends on the used standard and type of node in the network. The different nodes 10, 11 may have different capabilities or may use different sub-standards. These may be communicated to the first node 10, which may act as an access point, when associating with the network, such that a common ground for communication between the first and second nodes 10, 11 can be determined.

The first node 10, when acting as the access point, may determine the wireless channel to be used, based on the sensed channel occupancies and node capabilities, and negotiates with each node, such as the second node 11, the transmission parameters for their communication. Transmission powers and MCS, however, are adapted based on channel quality reports from ongoing communication.

On MAC layer, all nodes 10, 11 use a distributed communication based on a CSMA with collision avoidance (CSMA/CA) that employs an exponential back-off procedure. Therein, when one of the nodes 10, 11 has data packets to transmit it chooses a random waiting time (the back-off) that is uniformly distributed from an interval [$CW_{min}$; $CW_{max}$] (wherein the abbreviation "CW" usually stands for contention window), and starts a countdown that fires when the waiting time is over.

When the channel used for transmission is sensed busy, the countdown is paused and is resumed when the channel becomes idle again. After the countdown expires, the first node 10 transmits and waits for an acknowledgement (ACK) by the second node 11. If the ACK is not received, a packet loss is assumed, in which case the $CW_{max}$ parameter is increased. If the transmission of the data packet was successful as indicated by a received ACK, $CW_{max}$ is decreased.

Each node 10, 11 includes a VSE 12, a WSM 14, a WCS 16, and a WCON 18 as previously described. The nodes 10, 11 exchange parameter configuration space with each other, to reveal which channels the nodes 10, 11 can use, the underlying standard and supported MCS. Depending on the known parameter configuration space, the WCS 16 determines which settings and standards will be used for future communication between the nodes 10, 11. In other words, the WCS 16 of the nodes 10, 11 negotiate the parameter configuration space that is amenable for transmitting the data packets.

The WSM 14 gathers physical transmission property data from previous transmissions, such as received signal strength indicators (RSSI), signal to noise (SNR) values, and the like.

The VSE 12 assigns data validity values to the buffered data packets. Similar to the VDL Mode 2, an increasing function $g(t-t_s)$ is used, where t is the current time and $t_s$ the timestamp of the piece of data and the function g maps the data age to a data validity value that reflects transmission urgency.

The WCON 18 then takes the date validity values of all buffered data packets, identifies the data packet with the maximum data validity value and selects it for transmission. Taking the input from the WSM 14 and the WCS 16 the WCON 18 chooses an appropriate MCS from the parameter configuration space.

The WCON 18 may adapt the contention window [$CW_{min}$; $CW_{max}$] depending on the current data validity value.

For example, the WCON 18 can use the rule set
$CW_{min}=2$;
$CW_{max}=\min(1024; \max(2; \exp(c/g(t-t_s))))$, with min and max being the minimum and maximum function, respectively, exp being the exponential function, c being a predetermined constant, and $g(t-t_s)$ being the data validity value function. With this, it is made sure that the contention window is between 2 and 1024, wherein in the intermediate portion the data validity value changes exponentially. Again it is preferred that a large data validity value $g(t-t_s)$ confers a low $CW_{max}$ and therefore a greater transmission probability and lower delay, while a low data validity value confers a higher $CW_{max}$ and thus a lower transmission probability and greater delay.

Figure 3:
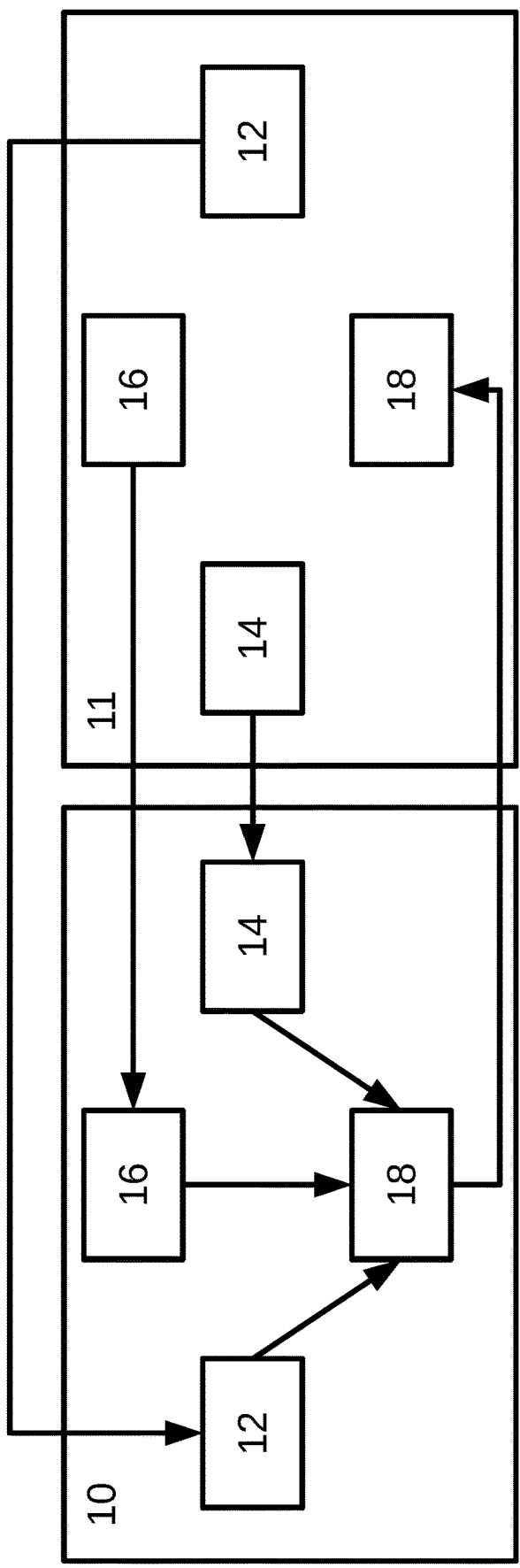
FIG. 3 depicts another embodiment of a wire communications network having multiple nodes.

Referring to FIG. 3, an embodiment for cellular communication is described. Throughout different cellular communications standards as standardized by the different releases of the 3GPP (e.g., 3G/4G/5G), a set of nodes resides in communication cells that are managed by central base stations. Therein, nodes are grouped into device categories, which define operation functionalities supported by the nodes. Cellular networks have different wireless resources that are assigned to the nodes for transmission. In 3G for example, each device is assigned a frequency, modulation and coding scheme (MCS), transmission power and separation code that it should use for transmission.

In 4G and 5G on the other hand, there are so-called "physical resource blocks" (PRBs) that refer to time-frequency slots on which devices may transmit. Again, each device may use a modulation and coding scheme (MCS), transmission powers and multi-antenna modes as assigned by the base station.

The cellular network includes a first node 10, preferably acting as base station, and one or more second nodes 11, such as a mobile phone or other end user devices. The first node 10 regularly emits a sounding reference signal (SRS) that the second nodes 11 use to achieve time synchronization and measure channel quality. When the second node 11, for example, has data packets to transmit in its transmission buffers, the second node 11 emits a transmission buffer state report and reports a channel quality indicator (CQI) using the WSM 14 to the first node 10, i.e. the base station. The first node 10, i.e. the base station, then decides based on the different requests and channel qualities, which second node 11 may transmit on which network resource, i.e., on which channel and with which configuration.

Both the first and second nodes 10, 11 have a VSE 12, a WSM 14, a WCS 16, and a WCON 18. Upon registration at the network, the WCS 16 of each second node 11 reports the category to the WCS 16 of the first node 10, i.e. the base station. The first node 10 stores the configuration options for each of the second nodes 11.

During the SRS, the WSM 14 of all second nodes 11 sense physical transmission property data, namely channel parameters, and report the results to the WSM 14 of the first node 10, which stores the result.

When a second node 11 wants to transmit data packets on the uplink towards the first node 10, the VSE 12 of the second node 11 reports data validity estimates to the VSE 12 of the first node 10.

The WCON 18 of the first node 10, depending on the current states of the first node's 10 VSE 12, WCS 16 and WSM 14, then assigns transmission parameters, namely transmission modes, transmission powers and wireless resources to each second node 11.

The result of the assignment is broadcasted to all second nodes 11, which then may transmit their data, upon receiving a transmission grant message from the first node 10.

For each second node 11, the data validity value is given by a function $g_i(t-t_{s,i}, c_i)$, wherein i designates the i-th second node 11, $t_{s,i}$ is the time stamp of i-th second node 11 and $c_i$ is the configuration that the first node 10 assigns to the i-th second node 11. The first node 10 performs the assignment of the data validity values to each second node 11 by solving the optimization problem $\mathrm{argmax}\Sigma_i(t-t_{s,i}, c_i)$ with "argmax" being defined as giving the elements of the domain of some target function at which the function values are maximized and the other symbols as previously explained.

This way, the WCON 18 schedules data packets to transmit the most urgent ones first. When the first node 10 needs to transmit data packets to the second nodes 11 on the downlink, it does not trigger the VSE report of the second nodes 11 but directly takes the estimates of its local transmission buffers, i.e. per-buffer data validity values. The scheduling is similar and the WCON 18 of the first directly configures the transmissions on the first node 10 instead of broadcasting a grant to the second nodes 11.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 node
11 node
12 validity and state estimation module (VSE)
14 wireless state monitor module (WSM)
16 wireless configuration space module (WCS)
18 wireless configurator module (WCON)

The invention claimed is:

1. A method for operating a node in a communications network for coordinating transmissions of different nodes in the network, the node comprising a validity state and estimation module (VSE), a wireless state monitor module (WSM), a wireless configuration space module (WCS), and a wireless configurator module (WCON), the method comprising:
   a) assigning a data validity value to a data packet and/or to a transmission buffer of the node by the VSE;
   b) storing the data packet in the transmission buffer;
   c) gathering physical transmission property data, by the WSM, the physical transmission property data being indicative of transmission properties of a communication link provided by the communications network between the node to another node in the communications network;
   d) determining a parameter configuration space, by the WCS, that is amenable for transmitting the data packet via the communication link;
   e) setting transmission parameters, by the WCON, that are included in the parameter configuration space for a data transmission over the communications network based on the data validity value and the physical transmission property data; and
   f) transmitting the data packet, by the node, from the transmission buffer over the communications network to another node at a point in time and in a manner determined by the transmission parameters set in step e).

2. The method according to claim 1, wherein the communications network is selected from a group consisting of a wireless communications network, a cellular network, a WiFi network, a radio communications network, an avionic communications network, and a satellite communications network.

3. The method according to claim 1, wherein step a) comprises assigning each data packet a packet data validity value and determining a transmission buffer data validity value based on the data packet validity values of the data packets to be stored in the same transmission buffer and assigning to the transmission buffer the transmission buffer data validity value as the data validity value.

4. The method according to claim 1, wherein in step a) the data validity value is based on a data packet age of the data packet or on at least one predetermined validity feature that is indicative for validity of the data packet, when the data packet is processed by another node.

5. The method according to claim 4, wherein the data packet age is determined based on a time interval between a point in time at which the data packet was generated or received by the VSE and a point in time at which the data packet is processed by another module or node.

6. The method according to claim 1, wherein the node comprises a plurality of transmission buffers, and in step b) each data packet is stored in one of the transmission buffers.

7. A non-transitory computer readable storage medium including instructions that, upon execution by a suitable data processing device, performs one, some or all of the steps of the method according to claim 1.

8. A non-transitory data carrier signal including the instructions according to claim 7.

9. The node configured for communicating in a communications network, wherein the node comprises the validity state and estimation module (VSE), the wireless state monitor module (WSM), the wireless configuration space module (WCS), and the wireless configurator module (WCON), and the node is configured to perform the method according to claim 1.

10. The node according to claim 9, wherein the node is configured as an avionic wireless communication device, a satellite communication device, a vehicle or a sensor for a vehicle, an aircraft, a drone, or a high-altitude platform.

11. A method for operating a communications network having a plurality of nodes for coordinating transmissions of the plurality of nodes in the network, each node comprising a validity state and estimation module (VSE), a wireless state monitor module (WSM), a wireless configuration space module (WCS), and a wireless configurator module (WCON), the method comprising:
 a) in at least one node, assigning a data validity value to a data packet and/or to a transmission buffer of the node by the VSE;
 b) storing the data packet in the transmission buffer;
 c) in at least one node, gathering physical transmission property data, by the WSM, the physical transmission property data being indicative of transmission properties of a communication link between a first node and a second node;
 d) in at least one node, determining a parameter configuration space, by the WCS, that is amenable for transmitting the data packet via the communication link;
 e) in at least one node, setting transmission parameters, that are included in the parameter configuration space, by the WCON for a data transmission over the communications network based on the data validity value and the physical transmission property data; and
 f) transmitting the data packet, by the first node, from the transmission buffer of the first node to the second node at a point in time and in a manner determined by the transmission parameters set in step e).

12. The method according to claim 11, wherein in step d) the respective WCS of the first node and the second node negotiate the parameter configuration space.

13. The method according to claim 11, wherein in step a) the VSE of the first node requests and receives from the VSE of the second node a validity estimate value, and the VSE of the first node determines the data validity value also on the received validity estimate value.

14. The method according to claim 11, wherein in step c) the WSM of the first node requests and receives from the WSM of the second node a physical transmission property data report that includes physical transmission property data as determined by the WSM of the second node, and the WSM of the first node determines the physical transmission property data also based on the physical transmission data report.

15. The method according to claim 11, wherein the communications network is selected from a group consisting of a wireless communications network, a cellular network, a WiFi network, a radio communications network, an avionic communications network, and a satellite communications network.

16. The method according to claim 11, wherein step a) comprises assigning each data packet a packet data validity value and determining a transmission buffer data validity value based on the data packet validity values of the data packets to be stored in the same transmission buffer and assigning to the transmission buffer the transmission buffer data validity value as the data validity value.

17. The method according to claim 11, wherein in step a) the data validity value is based on a data packet age of the data packet or on at least one predetermined validity feature that is indicative for validity of the data packet, when the data packet is processed by another node.

18. The method according to claim 17, wherein the data packet age is determined based on a time interval between a point in time at which the data packet was generated or received by the VSE and a point in time at which the data packet is processed by another module or node.

19. The method according to claim 11, wherein the node comprises a plurality of transmission buffers, and in step b) each data packet is stored in one of the transmission buffers.

* * * * *